Sept. 23, 1930.   G. PEGNA   1,776,700
FIN SYSTEM FOR HYDROAEROPLANES AND/OR WATER AIRCRAFT
Filed April 12, 1929    4 Sheets-Sheet 1
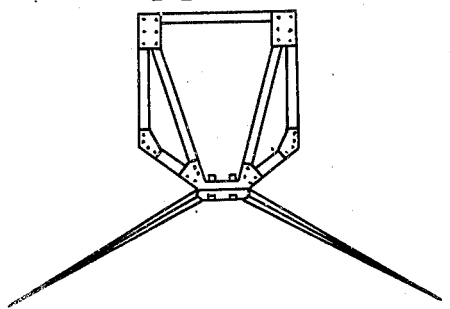
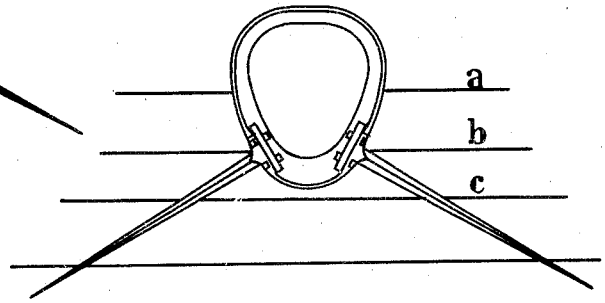
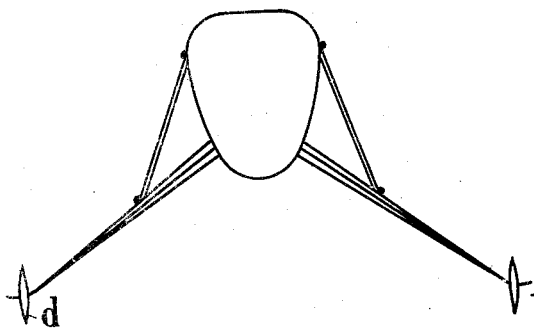
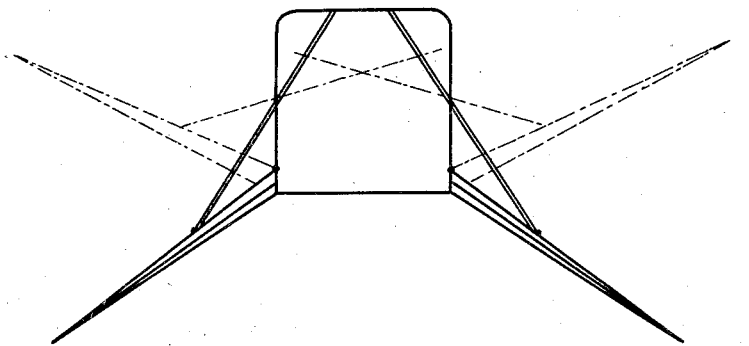
Inventor
G Pegna
By Marks & Clerk
Attorney Sept. 23, 1930.  G. PEGNA  1,776,700
FIN SYSTEM FOR HYDROAEROPLANES AND/OR WATER AIRCRAFT
Filed April 12, 1929  4 Sheets-Sheet 2

Inventor
G. Pegna
By Marlstller
Attorney

Sept. 23, 1930.   G. PEGNA   1,776,700
FIN SYSTEM FOR HYDROAEROPLANES AND/OR WATER AIRCRAFT
Filed April 12, 1929   4 Sheets-Sheet 3
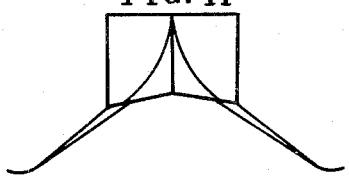
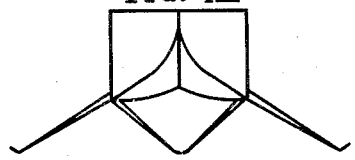
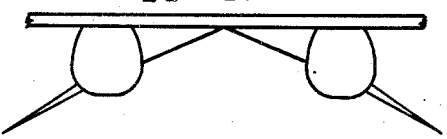
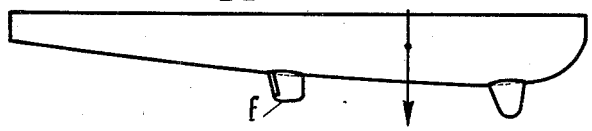
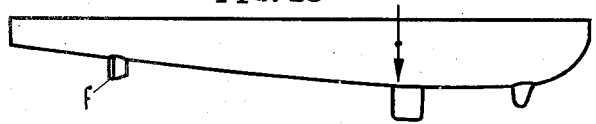
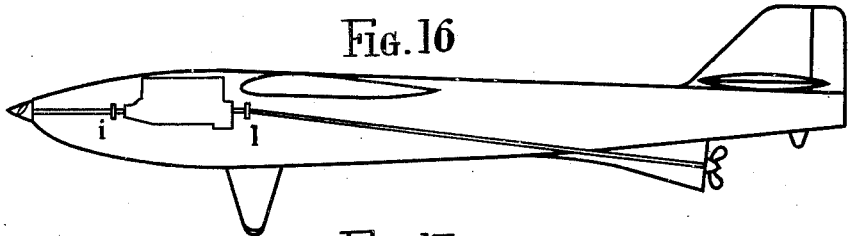
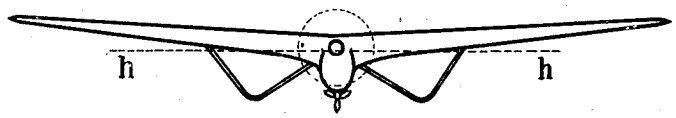
Inventor
G. Pegna
By Marts+Ller
Attorney Sept. 23, 1930.   G. PEGNA   1,776,700
FIN SYSTEM FOR HYDROAEROPLANES AND/OR WATER AIRCRAFT
Filed April 12, 1929   4 Sheets-Sheet 4
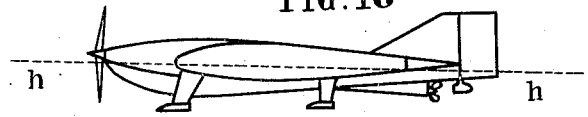
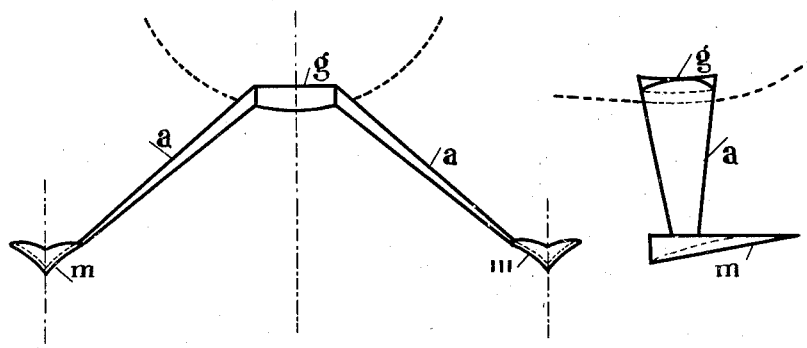
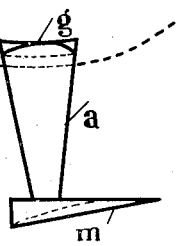
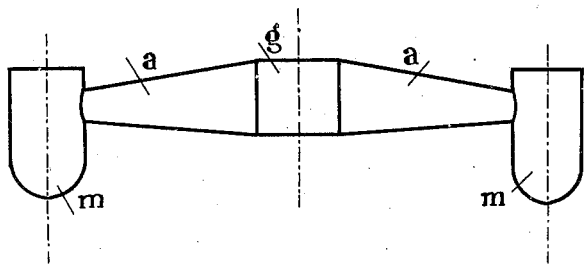
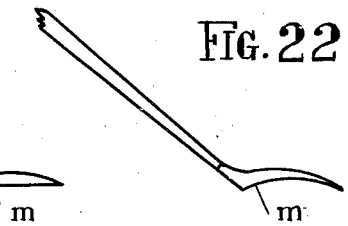

Patented Sept. 23, 1930

1,776,700

UNITED STATES PATENT OFFICE

GIOVANNI PEGNA, OF GENOA, ITALY, ASSIGNOR OF ONE-HALF TO SOCIETÀ ANONIMA PIAGGIO & C., OF GENOA, ITALY, A CORPORATION OF ITALY

FIN SYSTEM FOR HYDROAEROPLANES AND/OR WATER AIRCRAFT

Application filed April 12, 1929, Serial No. 354,643, and in Italy August 22, 1928.

This invention relates to a type of frontally downwardly sloping fin, attached to the bottom of hydroaeroplane floats, or also to the aerofoil system, permitting in combination with other like fins, to allow of a suitable emersion of said aircraft floats at suitable speed, and further permitting of a further racing on water of said crafts upon the fin ends and the taking off of water aircrafts.

In the accompanying drawing wherein various forms of the invention are illustrated, Figs. 1, 2, 3 and 4 are diagrammatic front elevations of float bodies showing the invention applied thereto;

Figs. 9, 10, 11, 12 and 13 are front elevations of further modifications;

Figs. 14, 15 and 16 are side elevations of various modifications;

Fig. 17 is a front elevation;

Fig. 18 is a side elevation of a modification;

Fig. 19 is a fragmentary front elevation of a further modification;

Fig. 20 is a side elevation of Fig. 19;

Figs. 21 and 22 are fragmentary detail views of modifications of the arrangement shown in Fig. 19; and Fig. 23 is a top plan view of the arrangement shown in Fig. 19.

Figure 5:
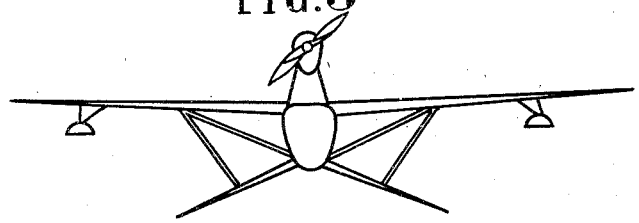
Figs. 5, 6 and 7 are front elevations of various forms of crafts constructed in accordance with various modified forms of the invention.

Referring to the drawing more in detail, Figure 1 shows an integral fin pair connected by means of bolts to the structures of an edge-keeled aircraft float. According to the embodiment shown in Figure 2, the two fins are separated and connected through slot and bolts to a curved-bottom float. Figure 4 shows a longitudinally hinged fin system, and in this instance the fins are connected to adjustable braces by which they may be brought to dotted-line position.

The fins may be constructed of wood or of metal or of both, in like manner as the aerofoils, having particular care to their plating owing to the greatly enhanced stresses to which they are subjected when running in water. Small sized fins may be integrally constructed, either of wood or of metal.

A portion of the resistant structure of the fins may be integral of the resistant structure of the aircraft body.

Figure 6:
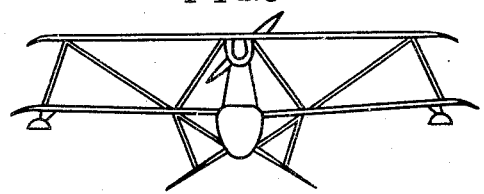

Figure 5 shows a monoplane and Figure 6 shows a biplane of standard types, with higher air propeller, and in both cases the resistant girder structure is formed by the longitudinal wing beams or girders and by the fin rips connected together by means of uprights, struts, braces, diagonals, or the like.

Figure 7:
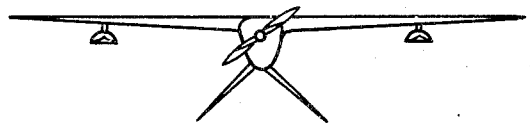

Figures 7 and 16 show a monoplane with low air propeller, fitted with a water propeller for running in water upon the fin ends. In this latter position the air propeller comes to be a sufficient distance above the water mirror, for a safe taking off.

*Emersion.*—The gradual reduction of submerged fin area and consequently of the coefficient of hydrodynamic carrying capacity, that should accompany the gradual speed increase of the aircraft, is obtained by the following substantial features of the fins, forming the object of this invention.

(1) The downward sloping of the fins;

(2) The reduction of depth of the fins, from their centre line towards the ends;

(3) The variation of the incidences from the centre towards the ends.

(4) This effect may also be increased or apportioned by giving the fins, towards their edges, particular shapes endowed with suitable coefficients of carrying capacity.

(5) For the same purpose as under (4), the front edges of the fins may be given a suitable bending, especially towards the ends (Figure 3).

*Transverse stability in water.*—In Figure 2 different positions of the float line are shown at different increasing speeds. The craft should of course possess a sufficient natural buoyancy when at rest (water line $a$).

At a speed corresponding to water line $b$, the said buoyancy might also be sufficient.

Should this be lacking, an additional couple of hydrodynamic transverse stability, controllable by the pilot, could be fitted.

Figure 8:
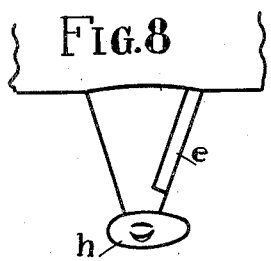
Fig. 8 is a fragmentary side elevation of the float body showing the invention applied thereto.
Figure 9:
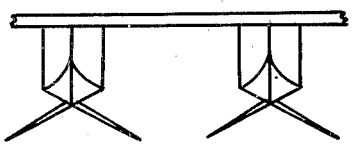
Figure 10:
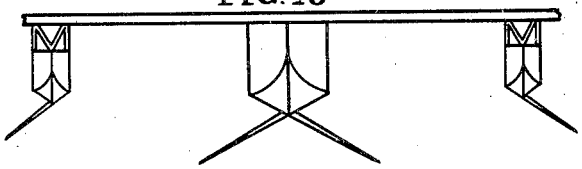

This is obtained by another substantial feature of the invention, i. e. by fitting on to each fin a hinged rudder fin e, Figure 8, and the hinged free portions may be oppositely controlled together simultaneously by the pilot as ordinary aerofoil ailerons, and together with these latter or separately therefrom.

When, owing to the excessively low speed of these latter the efficiency is not enough, additional efficiency is provided by the hinged fin sections.

At higher speeds, corresponding for instance to water lines $c$, $b$, the fins according to this invention possess an increasing transverse automatic hydrodynamic stability, and this with relation to the front inverted V arrangement.

The hydrodynamic transverse stability may be sufficient also even without hinged fins, when a pair of floats are employed with laterally coupled fins, instead of a central float.

Figures 9, 10, 11, 12, 13 and 17 show different groupings of fin pairs in transverse directions.

*Longitudinal stability and balance in water.*—With a single fin pair it is not generally possible to obtain the longitudinal stability in water.

As in the case of the wing-empennage system of aeroplanes, at least two fin pairs are necessary, one pair of fore fins and one of aft fins.

The stability and longitudinal balance principally depend (apart from the influence of the air upon the aerofoil system for the seaplanes and that of the hull shapes) upon the position of the two fin pairs with relation to the barycentre and upon the hydrodynamic characteristics of each of these pairs.

Figures 14, 15, 16 show different groupings of fin pairs in longitudinal direction.

In order to control within suitable limits both the longitudinal stability and balances, each fin of the aft pair may be fitted with hinged controllable fin sections $f$, Figures 14 and 15, simultaneously controllable by the pilot like the movable part of the horizontal empennage of an aircraft, and this constitutes another feature of the fins, object of this invention.

*Route stability.*—For the purpose of avoiding the serpentine movement and that of drift at high speeds, the fins may be fitted at their ends with longitudinal vertical surfaces, possessing shapes or outlines of good penetrating effectiveness. (Figure 3.)

The aft fins may be provided with hinged sections, like that herein before described, and controllable by the pilot like steering rudders.

The same route stabilization may be obtained by a drift plane directly attached to the hull and by a water rudder, also attached to the hull.

The said longitudinal surfaces are efficient in hydroplanes, both for correcting any eventual adrift sea-landing, or for taking off with a side wind.

*Taking off and coming down.*—When the hydroplanes are fitted with sufficiently high positioned air propellers, as in usual seaplanes, (Figures 5 and 6) the coming down and taking off is effected as usual.

When seacrafts are employed with low air propellers, (Figures 7 and 16) it is necessary to bring them to bear upon the fin end portions, by starting same by means of water propellers driven by auxiliary engines.

Then the air propellers are started, by their engines, and as they are sufficiently high above the water mirror, they allow an easy taking off.

The air propellers, when they are at rest, are maintained with their blades in horizontal position, for instance by suitable stops fitted upon the driving shaft.

A single engine may be employed both for driving the water propeller and the air propeller, and in this instance a pair of clutch couplings will be provided, preferably of the friction type, that are indicated by $i$ and $l$ in Figure 16.

When coming down, the first contact is with the fin points, the air propellers being yet in movement. As soon as the craft hull is in water, if desired, the water propellers are started, and the air propellers are stopped in their horizontal position, and afterwards also the water propellers, if in movement, are stopped. It is also possible to come down with the water propeller already in movement, and even with all propellers stopped.

*High speed fins.*—It has been experienced that the fins and combinations thereof are well suited for hydroaeroplanes and for taking off and coming down up to speeds of about one hundred kilometres per hour.

When the speed of the said fins with regards to water passes this value, a tendency is experienced to a detachment of the fluid vein from the fin back, with a consequent inlet of air at atmospheric pressure and immediate falling down of their hydrodynamic carrying capacity.

In order to avoid this inconvenience, to the lower fin ends horizontal slides or slippers are fitted, corresponding to a portion of bottom of an ordinary seaplane float, forwardly of the step thereof.

The fins then serve to initially substitute the buoyancy of the usual floats, while the slippers may be considered an embodiment of the principles set out in the 4th and 5th paragraphs under the title "Emersion". The shape and arrangement of the said slippers may vary (Figures 19, 20, 21, 22, 23).

Figures 17 and 18 show in front and side view respectively a seaplane fitted with a combination of fin pairs and slippers, to the purpose of obtaining both the longitudinal and transverse dynamic stability of the whole, while the static stability (line of buoyancy h—h) is provided by the water tight wings.

The aforesaid combination and other of like design are derived from considerations upon the resistance of the materials, permitting the necessary hydro- and aerodynamic efficiency, though with a structural weight, by parity of safety coefficient, less than that with projecting fins.

As may be seen in Figures 19, 20, 21, 22 and 23, fins $a$ fastened at a symmetrical angle at $g$ to a seaplane float, terminate at their lower edges in slippers $m$ that may be constituted by centrally plane surfaces, of plane, concave or convex general design, provided the supporting push to the craft beyond predetermined speed limits be exclusively due to hydrodynamic pressure exerted upon their downwardly directed surface and oriented to this purpose with a suitable incidence. Thus, when the limit speed is passed, and the hydrodynamic carrying capacity of the fins falls for the reasons above referred to, the hydrodynamic carrying capacity of the slippers enters into action to replace this deficiency.

These slippers thus correspond to a surface expansion of the fin edges, and are designed for integrating by action of the hydrodynamic pressure upon their lower surfaces, the total required amount of total hydrodynamic carrying capacity that for the above reasons is absent upon the fin back. In some cases no difference could be made between slipper and fin, as the slipper results in a simple bending of the fin edge, as for instance in the case shown in Figure 3.

Of course the said slippers may be constructed and fitted in many ways, according to the type, shape and size of the fins to which they apply, though remaining within the limits of the invention.

*Springing or shock absorbing device.*—At high speeds a certain amount of somewhat vertical play may be necessary for the slippers, though allowing their incidences to conserve substantially their originary value, and in every instance that these incidences may tend to increase, instead of diminish.

This displacement should be counteracted by a force by the fin or its supporting structure, which force, being multiplied by the almost vertical path of movement of the slipper should absorb any deformation stress, thus cooperating to weaken and render tolerable the effects due to impingement against the water waves.

To this purpose the structures and mechanisms of the kind employed in motor vehicle wheels are well suited, and also that commonly employed for aircraft landing gear.

Having thus described my invention, I claim:

1. A hydroplane including a body, downwardly and outwardly inclined fins attached to the body adapted to gradually emerge from the water during increase of speed whereby to obtain increasing hydrodynamic stability.

2. A hydroplane as claimed in claim 1, characterized by the provision of oppositely controllable hinger sections to provide dynamic stability when the fins are insufficiently emersed to provide for the necessary automatic transverse stability.

3. A hydroplane as claimed in claim 1, characterized by the provision of hinged sections simultaneously controlled to provide variation of the total coefficient of carrying capacity with respect to stability and longitudinal balance.

4. A hydroplane as claimed in claim 1, characterized in that the fins are arranged in a plurality of pairs.

5. A hydroplane as claimed in claim 1, characterized by the provision of a hinge for permitting upward folding of the fin under the control of the pilot whereby to diminish the total immersion thereof.

6. A hydroplane as claimed in claim 1, characterized by the provision of extensions on the fins adapted to exert a vertical push by the hydrodynamic pressure on the underside thereof.

7. A hydroplane as claimed in claim 1, characterized by the provision of extensions on the fins adapted to exert a vertical push by the hydrodynamic pressure on the underside thereof, the fins provided with the extensions being arranged in a plurality of pairs.

8. A hydroplane as claimed in claim 1, characterized by the provision of extensions on the fins adapted to exert a vertical push by the hydrodynamic pressure on the underside thereof, and means connecting the extensions of the fins to the body of the hydroplane.

In testimony whereof I affix my signature.

GIOVANNI PEGNA.